United States Patent [19]

Spring

[11] Patent Number: 5,669,547

[45] Date of Patent: Sep. 23, 1997

[54] APPARATUS AND METHOD FOR SUPPLYING INERT GAS TO A WELDING LOCATION

[75] Inventor: Frank W. Spring, Etobicoke, Canada

[73] Assignee: Praxair Technology, Inc., Danbury, Conn.

[21] Appl. No.: 534,283

[22] Filed: Sep. 27, 1995

[51] Int. Cl.⁶ .................................................. B23K 9/16
[52] U.S. Cl. ........................ 228/219; 228/42; 228/48
[58] Field of Search ...................... 228/219, 42, 44.5, 228/48; 219/61, 60 A, 74

[56] References Cited

U.S. PATENT DOCUMENTS

| | | | |
|---|---|---|---|
| 2,254,792 | 9/1941 | Brown | 228/48 |
| 3,424,887 | 1/1969 | Fehlman | 228/42 |
| 3,920,177 | 11/1975 | Wilson et al. | 228/218 |
| 4,437,710 | 3/1984 | MacFarland et al. | 228/193 |
| 4,916,281 | 4/1990 | Flasche et al. | 219/61 |
| 5,187,343 | 2/1993 | Edwards | 228/219 |

FOREIGN PATENT DOCUMENTS

| | | |
|---|---|---|
| 536491-A2 | 4/1993 | European Pat. Off. . |
| 2379349 | 10/1978 | France ...................... 228/42 |
| 5146893 | 6/1993 | Japan . |
| 2177638 | 1/1987 | United Kingdom . |
| 2201623 | 9/1988 | United Kingdom . |
| 2259023 | 3/1993 | United Kingdom . |

OTHER PUBLICATIONS

"Basic Welding Data. No. 18: Purging," Welding & Metal Fabrication, 1995.

Lucas, W., "Shielding Gases For Arc Welding—Part 1," Welding & Metal Fabrication, Jun. 1992, pp. 218–223.

Holby, Eric, "Purging Practices For Nuclear Pipe Welding," Welding Engineering, Jan. 1973.

Jeyapal, R. P., "Purging Practices For Pipe Welding," Indian Welding Journal, Sep. 1976, pp. 99–102.

Burkle, W.S. and Lightfoot, J.O., "Practical Guidelines For Pipe Purging," Welding Journal, May 1980, pp. 34–37.

Holby, Eric. R., "Power–Plant Pipe Must Be Leak–Free," Welding Design & Fabrication, Mar. 1986, pp. 59–62.

"Recommended Practices For Root Pass Welding Of Pipe Without Backing," D10.11–80, The American Welding Society, 1995, pp. 1–11.

Flasche, L.; Hoback, G.; and Meyers, J.; "Nickel Alloy Pipe Systems: Back Purging And Welding Requirements," 1995, pp. 7–10.

*Primary Examiner*—Samuel M. Heinrich
*Attorney, Agent, or Firm*—Bharat C. Gandhi

[57] ABSTRACT

An apparatus for providing inert gas to a desired location for a welding operation is provided. The apparatus includes a gas feed line and structure for mounting the feed line to extend in a first direction in a pipe. A gas locator tube communicates with the gas feed line to direct inert gas from the gas feed line in a second direction, different from the first direction, towards a pipe joint to be welded. The locator tube is capable of continually directing inert gas in the second direction as the pipe is rotated during a welding operation.

12 Claims, 3 Drawing Sheets

APPARATUS AND METHOD FOR SUPPLYING INERT GAS TO A WELDING LOCATION

FIELD OF THE INVENTION

The present invention relates to an apparatus for supplying inert gas to a welding location, and more particularly, to an apparatus for concentrating an inert gas at a localized region along a pipe joint to be welded.

BACKGROUND OF THE INVENTION

In TIG (tungsten inert gas) welding and some other welding methods, it is desirable to establish an inert atmosphere in the region of a desired weld joint, such as between two pipe butt ends. To weld such a joint, typically the pipe ends are beveled to a weld angle of about 35° and cleaned. Thereafter, a purge dam apparatus can be installed, as more fully discussed below. The pipe sections are then fit-up to establish proper root-gap tolerances between two pipe sections. Generally, the root gap should be approximately 3/32" or at least 1/32" larger than the diameter of welding filler wire to be used.

Next, the pipe interiors adjacent the pipe ends are purged. Conventionally, such purging is done in a two-stage operation. During the first stage, prior to welding, an inert purge gas is used to displace the air in the pipe until the gas inside the pipe reaches an acceptably low oxygen level. Without an inert atmosphere in the pipes, the interior surface of the welded joint is subject to oxidation, inclusion of impurities and incomplete fusion of the pipe edges, particularly with stainless steel pipes. Once the required oxygen level inside the pipe has been achieved, normally 1% or less, a welding operation can be initiated. During the second stage, the purge gas flow rate is reduced for welding to prevent excessive root concavity and to keep the root weld puddle from "blowing out" from too great a back pressure. However, a purge gas flow rate is maintained sufficient so that the purge maintains a slight positive pressure on the inside of the pipe while the root pass is welded to eliminate air re-entry into the pipe, minimize oxidation of the root surface and produce a smooth bead profile. In addition, during welding the arc zone is filled with a shielding inert gas to surround the arc and thereby protect the electrode and molten metal from oxidation.

Currently, two methods are utilized to back-purge a pipe root pass weld zone. In one method, the entire volume of a long pipe run is subject to purge gas flow. However, this requires a large amount of purging gas, typically argon, particularly with pipe work of large diameter.

Rather than losing the time and gas volume filling the entire piping system with argon, operators commonly fit gas-retaining dams on each side of the weld zone inside the pipe system to create a small gas chamber which isolates the inside diameter a few inches on each side of the joint. Various types of closure dams are known including soluble dams, inflatable bladder dams, collapsible disk dams and thermally disposable dams. Although such systems are successful in reducing gas consumption over the first described method, there is still a significant time requirement to purge the zone between the dam using a two-stage operation, particularly with respect to that required for the pre-welding operation first stage purge. Necessarily, the time required for the first stage of purging depends on the maximum oxygen level permitted by the welding procedure, the volume of the system being purged, and the purge gas flow rate. However, the relationships between the purge gas flow rates and time are not linear; i.e., a system that can be purged in one hour at a flow rate of 50 c.f.h. generally will not be purged to the same degree in one-half hour if the flow rate is increased to 100 c.f.h. An increase in the purge flow rate increases the turbulence within the system, which results in an increase in the mixing of air and the inert purge gas. This will require additional volume changes of gas within the pipe to achieve the desired level of purity, generally at least four to five volume changes for high purge gas flow rates. At lower flow rates, less mixing occurs, and the heavier purge gas forces the air upward and out of the pipe system. The lower purge gas flow rates require correspondingly lower volume of purge gas used since as few as two or three volume changes can be made to yield a sufficiently oxygen-free atmosphere for welding. On the other hand, such lower gas flow rates correspondingly increase the time required to achieve such an oxygen-free atmosphere.

To make the weld, the weld joint should be sealed around the circumference of the pipe with masking tape to prevent the escape of purge gas. Typically, the pipe sections are fitted in a device that allows an operator to rotate the pipe sections as welding progresses by a remote control, such as by a foot control pedal. During the welding of the root pass, the welder should peel the tape off the joint in increments just prior to welding that increment. Initially, at least three to four tack welds should be made circumferentially spaced around the pipe to ensure that the two pipe sections do not move during subsequent closure welding. Tack welding is not usually performed until pre-weld or first stage purging has been completed and should be done with care because the tack welds normally become part of the final weld. Generally, the weld joint is kept sealed except in the area where welding is being conducted. The tack welds are then ground to a feather edge to ensure that the closure welds will fuse into the tack welds. Finally, closure welding is performed much like the tack welding. Again, the joint is kept sealed except in the area where welding is being performed. Again, to do this, as a welder approaches the tape, the welder peels it back, an inch or so at a time, until the weld is completed. As such, a welder has a limited view of the internal weld bead during a welding operation so that it is fairly difficult for the welder to correct any deficiencies in the bead during the welding operation.

Thus, there is a need for an apparatus which allows for a more economic purging of pipes such as by reducing the time required for purging with the abovedescribed processes while maintaining gas consumption at a reasonable level and which allows the welder an unimpeded view of the weld bead as it is created during a welding operation.

SUMMARY OF THE INVENTION

In accordance with the present invention, an apparatus and method for providing inert gas to a desired location for a welding operation is provided which overcomes the aforementioned problems of the prior art.

In one form, the apparatus includes a gas feed line and structure for mounting the feed line to extend in a first direction in a pipe. A gas locator tube communicates with the gas feed line to direct inert gas from the gas feed line in a second direction different from the first direction towards a pipe joint to be welded. The locator tube is capable of continually directing inert gas in the second direction as the pipe is rotated during a welding operation. Preferably, the first and second directions are substantially perpendicular to each other. The first direction can be in an axial direction and the second direction can be in a radial direction relative to the pipe.

In one form, the gas locator tube is an elongate tube having spaced ends with one end including a gas outlet port and the other end including an enlarged weighted counterbalance. The gas outlet port is adjacent the pipe joint to be welded. The elongate tube can include a trailing shield at the one end so that the gas ejected from the outlet port is localized along the joint to be welded.

The mounting structure can include an elongate hub shaft and locating member with the hub shaft having the gas feed line extending therethrough and being rotatable about the gas feed line. The locating member can be mounted to the hub shaft and sized to snugly fit within the pipe whereby the hub shaft and locating member rotate with the pipe about the feed line as the pipe is rotated during a welding operation.

In one form, the apparatus is in combination with the pipe.

In another form of the invention, an apparatus for concentrating an inert gas at a localized region along a pipe joint to be welded is provided. The apparatus includes a gas feed line directing an inert gas axially along the length of a pipe and a locating member including a central aperture therethrough mounted in the pipe axially spaced from a joint to be welded. A shaft and bearing assembly extends through the locating member's central aperture with the gas feed line extending through the assembly. The pendulum structure is attached to the gas feed line for directing inert gas from the feed line in a predetermined radial direction at the butt end of the pipe towards the joint to be welded as the pipe is welded during a welding operation.

The pendulum structure can include an elongate member having a hollow tube portion connected to the gas feed line extending perpendicular thereto and an enlarged weighted counterbalance portion at the bottom of the elongate member to maintain the member in substantially an upright position as the pipe is rotated during a welding operation.

The locating member can include expansible air ram means for securely engaging an inner wall surface of the pipe to position the gas feed line substantially along a central longitudinal axis of the pipe during a welding operation.

The locating member can be mounted on the shaft and bearing assembly with the shaft and bearing assembly and locating member rotating about the feed line as the pipe is rotated during a welding operation.

In yet another form of the invention, an inert gas feed assembly is provided including an inert gas feed means for directing inert gas from an inert gas source into a pipe and adjacent a pipe joint to be welded and positioning structure for securely mounting the inert gas feed means in a predetermined position in the pipe. A trailing shield is attached to the inert gas feed means and defines a localized zone for inert gas adjacent the pipe joint to be welded. The pendulum structure cooperates with the inert gas feed means to direct inert gas to the trailing shield adjacent the pipe joint to be welded such that during a welding operation the trailing shield moves between (1) a first position relative to the pipe joint to be welded, (2) a second position angularly displaced from the first position relative to the pipe joint to be welded with the angular displacement substantially corresponding to the angular displacement of the pipe during rotation thereof as a joint is being welded.

The pendulum structure can include an elongate member having a hollow tube portion connected to the gas feed structure and an enlarged counterbalance portion at the bottom of the elongate member to maintain the member in a substantially upright position as the pipe is rotated during a welding operation.

The invention further contemplates a method of supplying inert gas to a localized zone adjacent a pipe joint to be welded. The method includes the steps of directing inert gas through an inert gas feed tube having a delivery end along the length of a pipe to the butt end thereof toward a joint to be welded, causing the inert gas to accumulate in a localized region at the joint to be welded to substantially purge the region of other gases before a welding operation begins, and maintaining the delivery end at a predetermined substantially fixed location which remains adjacent the top of the pipe interior after the welding operation begins and as the pipe is rotated during the welding operation.

The method can further include the step of redirecting the inert gas after it has reached the butt end of the pipe radially toward the joint to be welded.

In one form, the step of directing inert gas includes the step of providing an elongate member having a hollow tube portion and inert gas is caused to accumulate in the joint region by extending the hollow tube portion towards the joint region.

In one form, the step of maintaining the region at a predetermined substantially fixed location in the pipe includes the step of counterbalancing the elongate member to maintain the hollow tube portion in an upright position extending towards the joint region as the pipe is rotated during a welding operation.

DETAILED DESCRIPTION OF THE PREFERRED EMBODIMENTS

Figure 1:
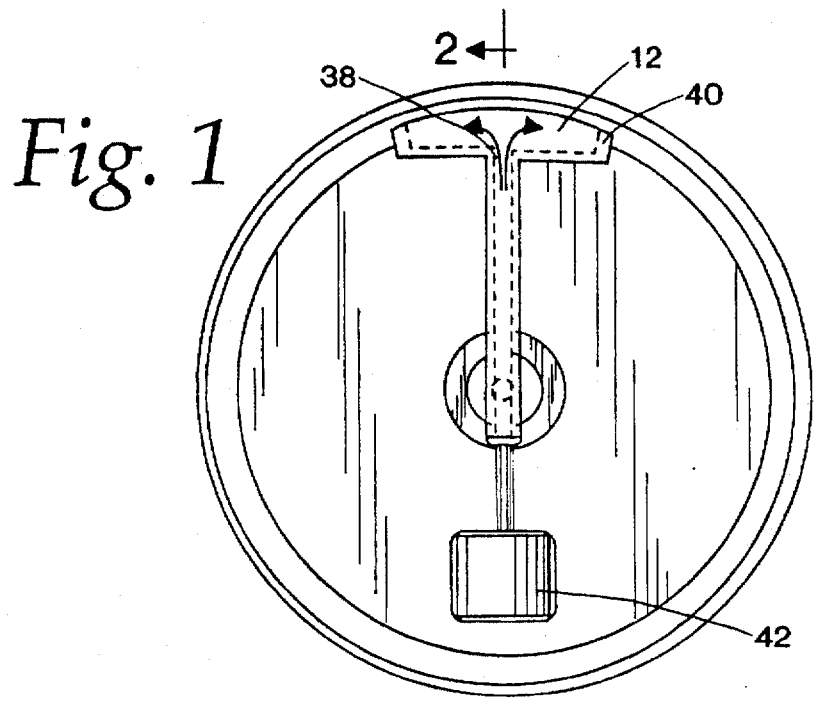
FIG. 1 is an end view of a pipe section to be welded including an apparatus for supplying inert gas to a welding location, according to the invention.
Figure 2:
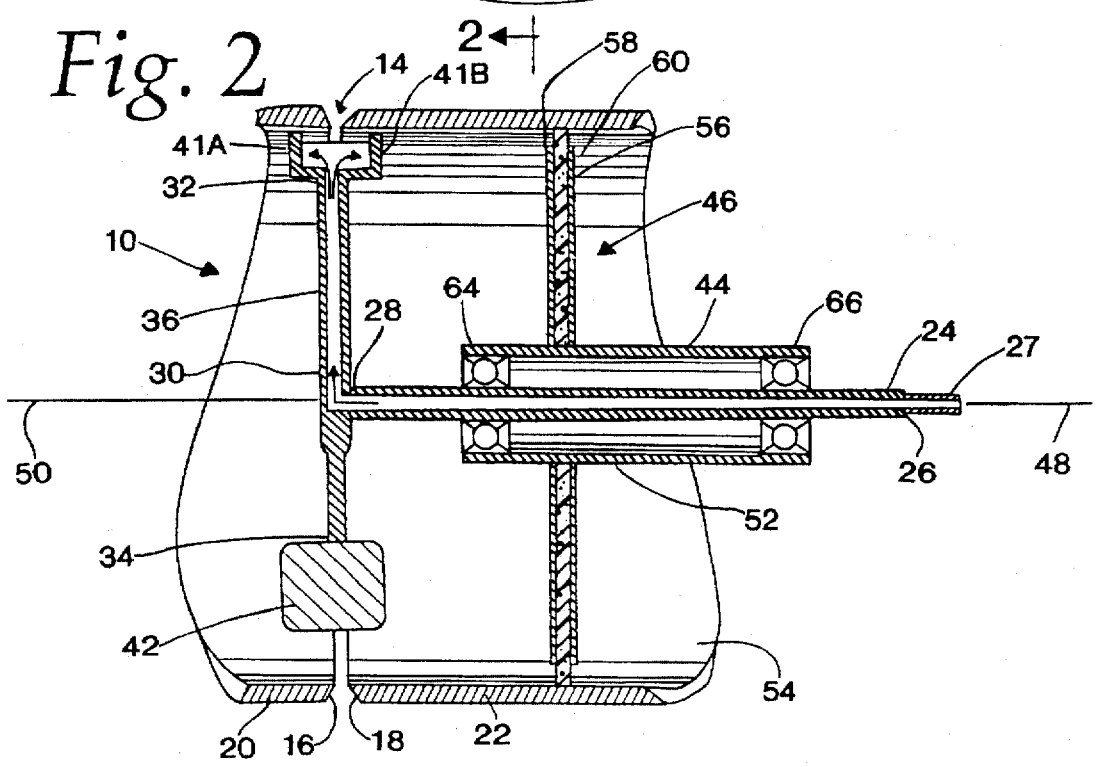
FIG. 2 is a cross-sectional view taken along line 2—2 of FIG. 1.
Figure 3:
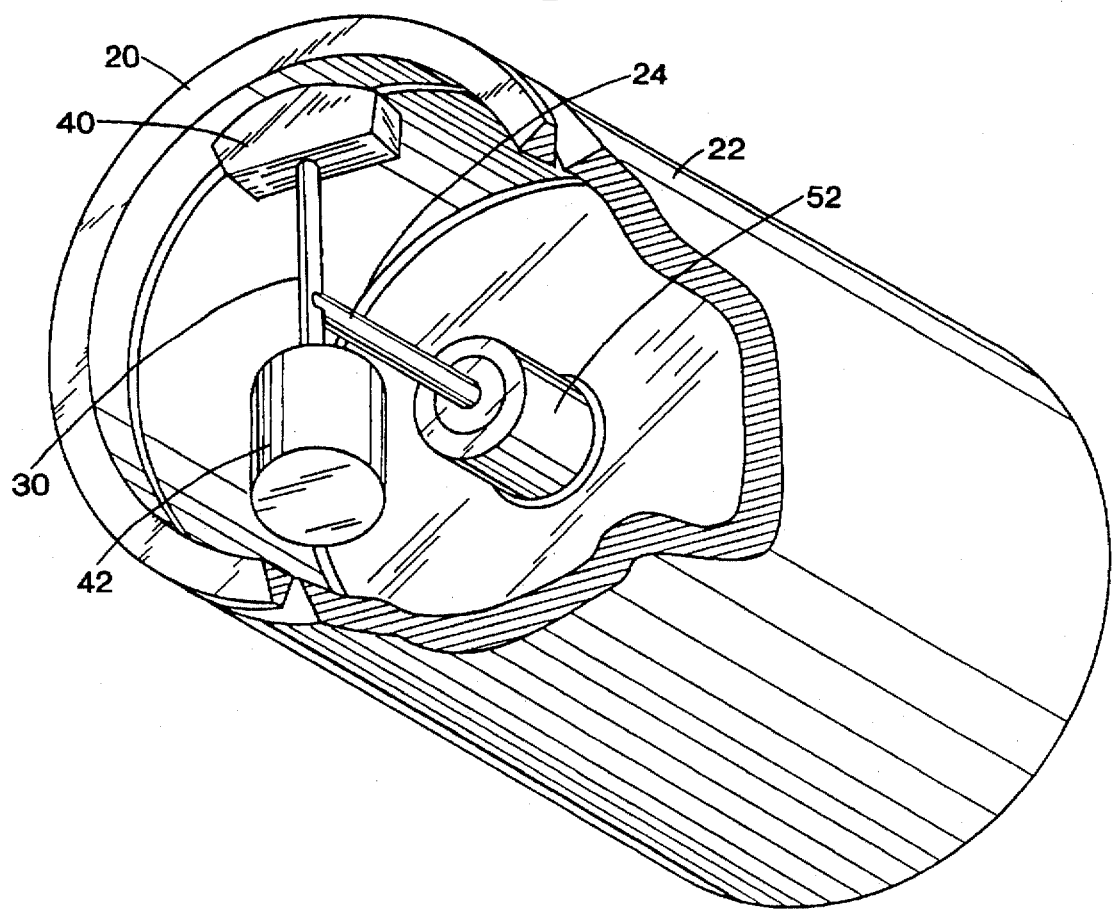
FIG. 3 is a perspective view of the apparatus illustrated in FIGS. 1 and 2.

FIGS. 1–3 illustrate an apparatus 10 for back-purging a localized region 12 on the underside of a pipe joint 14 formed between two butt ends 16 and 18 of corresponding pipe sections 20 and 22 to be welded. In the purging apparatus 10, a gas feed line 24 is connected at one end 26 to a source of inert gas, such as argon, as by a hose quick disconnect mechanism as at 27, and at its other end 28 to an elongate member 30. The gas feed line 24 can be of typical construction, such as stainless steel tubing and the like, with the gas feed line 24 being modified at its end 28 by attaching the elongate member 30 thereto as by welding or the like. The elongate member 30 is attached to the gas feed line 24 such that it extends at right angles thereto. The member 30 has spaced ends 32 and 34 and includes a hollow tube portion 36 which redirects inert gas from the gas feed line 24 towards the pipe joint 14 to be welded.

At the end 32 of the member 30, the tube portion 36 has a gas outlet port 38 with a trough-shaped trailing shield 40 formed thereat so that inert gas ejected from the outlet port 38 is substantially confined in the localized region 12 along the pipe joint 14 to be welded. The trailing shield trough 40 has parallel sidewalls 41A and 41B which extend towards the pipe joint 14 and are spaced approximately ¼" therefrom. The sidewalls 41A and 41B are also provided with a radius of curvature at their upper surfaces to substantially match that of the pipe to more effectively maintain purge gas in the region 12. In this manner, an entire section of the interior of the pipe sections 20 and 22 need not be isolated as by dams and the like utilized in the prior art and then purged in the previously described two-step back purging operation as the trailing shield 40 more specifically locates inert gas at the precise region being welded to allow for an instant purge in region 12 and, therefore, the weld area.

As described earlier, the pipe sections 20 and 22 generally will be fit-up in an apparatus (not shown) which allows a welder to rotate the pipes during a welding operation by means of a foot pedal so that the welder need not move the welding torch and filler metal around the circumference of the pipe sections 20 and 22 to complete the weld of the pipe joint 14. Generally, it is desirable for welding to be performed in the flat, 12 o'clock, position. To maintain the localized region 12 of inert gas in the upright, 12 o'clock, position, the elongate member 30 includes an enlarged, weighted counterbalance 42 formed at its other end 34. Although illustrated and described as being in an upright, 12 o'clock position, it will be appreciated that the counterbalance 42 can be formed and weighted to cant the elongate member 30 to one side or the other of the vertical, if so desired.

Thus, with the purging apparatus 10, as described herein, the localized region of inert gas 12 will continually be maintained at the precise location where welding is to take place in the relatively small, confined area defined by the trailing shield 40. In this manner, the two-stage operation required with the dam-based apparatuses previously described is no longer necessary as the area 12 defined by the trailing shield 40 can be purged in a matter of seconds.

To accurately position the purging apparatus 10 for back-purging the previously described localized region 12, a hub shaft and bearing assembly 44 and a locating member 46 are provided. The locating member 46 can be sized to snugly fit within a pipe with the assembly 44 extending through the center of the locating member so that with the locating member installed in the pipe section 22, the assembly 44 extends along the central, longitudinal axis 48 of the pipe section 22, which should substantially correspond with the axis 50 of the pipe section 20 with the pipe sections 20 and 22 fitted up for a welding operation.

More specifically, the hub shaft and bearing assembly 44 includes an elongate, cylindrical hub portion 52 which extends substantially through the middle of the locating member 46. Although the assembly 44 is described and illustrated as extending along the central axes of the pipes, it will be appreciated that the assembly 44 can be positioned differently relative to the pipe central axis 48 with the apparatus 10 still providing inert gas to the localized region 12.

The locating member 46 can be sized to snugly fit within a pipe, such as pipe section 22, so that the locating member securely engages the inner wall surface 54 of the pipe section 22 so as to preferably position the gas feed line 24 along the central axis 48 of the pipe section 22. In one form, the locating member can have a central portion 56 made from a rubber or other resiliently flexible material. Preferably, the locating member 46 has a circular shape and a diameter at least ¼" larger than the diameter of the inner wall surface 54 of the pipe section 22. On either side of the circular rubber portion 56, a pair of circular steel plates 58 can be adhered thereto with both the rubber portion 56 and the circular plates 58 and 60 having central apertures to form a ring shape so that the cylindrical portion 52 of the shaft and bearing assembly 44 can be fit therethrough and be removably attached to the locating member 46 as by a bayonet connection or the like.

The cylindrical portion 52 includes roller bearings 64 and 66 at either end thereof with the gas feed line 24 extending through the bearings 64 and 66 so as to be journalled for rotation in the cylindrical portion 52.

Thus, with the purging apparatus 10 installed in pipe section 22, and with the pipe sections 20 and 22 fitted up for a welding operation such that their respective axes 50 and 48 are substantially aligned with one another, the circular rubber portion 56 will frictionally engage the pipe inner wall surface 54 to substantially fix the locating member 46 and the shaft and bearing assembly 44 in the pipe section 22 with the cylindrical portion 52 extending axially in the pipe section 22 along the axis 48. The apparatus 10 can be slid into position wherein the elongate member 30 is at the butt ends 16 and 18 of the pipe sections 20 and 22 so that it extends towards the joint 14 to be welded. With the purging apparatus 10 so installed, as the welder rotates the pipe sections 20 and 22 during a welding operation, the shaft and bearing assembly 44 and the locating member 46 rotate along with the pipe sections. On the other hand, as the gas feed line 24 is journalled for rotation in the cylindrical portion 52, the counterbalance 42 will act under the influence of gravity as a pendulum to minimize the angular movement of the elongate member 30 and maintain the elongate member 30 extending in a substantially upright, radial direction at the butt end 18 of the pipe section 22 with the locating member 46 and attached cylindrical portion 52 rotating about the gas feed line 24 as the pipe sections are rotated during a welding operation.

With the purging apparatus 10 as described herein, the two-stage purging system utilized with dam-based apparatuses is eliminated as the localized region 12 of inert gas is much smaller in comparison to the region formed between dams on opposite sides of a joint to be welded and correspondingly requires significantly less time to be purged. Moreover, the required use of tape for maintaining purge gas within the zone between the dams in the piping system is eliminated, providing a more open view of the welded joint during formation, more readily permitting visual inspection of a root pass weld minutes after completion, thereby allowing for immediate rectification of any problems, if required.

For comparison purposes, test welding operations were performed utilizing the two-stage purging process with purge dams and the purging apparatus 10 described herein. Performing a typical welding operation for stainless steel pipes having an 18-inch O.D. with purge dams set back approximately 3 inches on either side of the joint, the initial purge was conducted at 30 c.f.h. for approximately five minutes. During the reduced purge gas flow second stage for welding, the flow rate was reduced to 5 c.f.h. for approximately 15 minutes before the actual welding process was initiated. Welding was then completed in 15 minutes while continuing the low flow rate second stage purge. In total, approximately 5.0 cubic feet of purge gas was used with the total welding operation taking approximately 35 minutes. Utilizing the purge apparatus 10 described herein for welding another 18" O.D. joint, the purge gas flow was set at 60 c.f.h. with welding beginning approximately the same time the purge gas flow begins. With the actual welding process taking approximately 15 minutes, the total gas volume used was approximately 15 cubic feet which increases gas consumption over the previously described method utilizing dams set back on either side of the joint. However, the time savings using the apparatus 10 of the present invention are significant: assuming labor and overhead to be approximately $45 per hour, the purging apparatus saves approximately 20 minutes or $15 per pipe joint welded as the dam system required 35 minutes for completion of a root pass while the purging apparatus 10 only requires 15 minutes. In addition, with the cost of purge gas at approximately $0.18 per cubic foot, the addition of 10 cubic feet only costs approximately $1.80 extra, thus still yielding a savings of approximately $13 per joint despite increased gas consumption.

Figure 4:
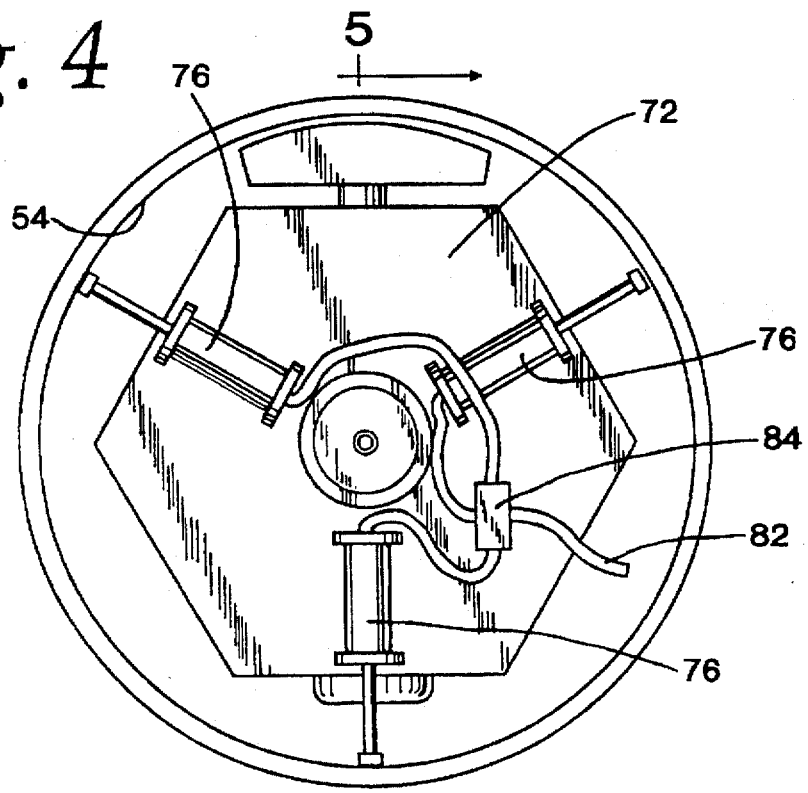
FIG. 4 is an end view of a pipe section to be welded and showing an alternative embodiment of an apparatus for supplying inert gas to a welding location according to the invention.
Figure 5:
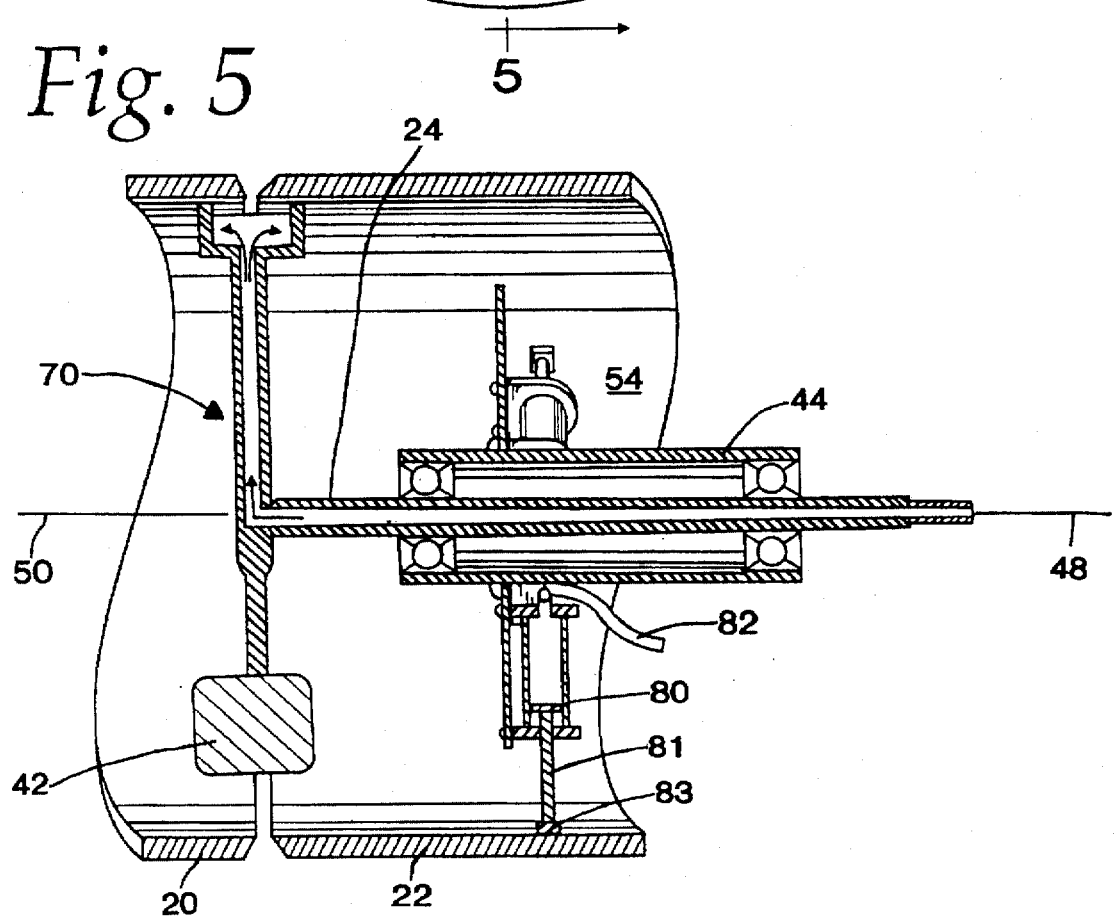
FIG. 5 is a cross-sectional view taken along 5—5 of FIG. 4.

It is also desirable that the purging apparatus 10 described herein be usable with a wide variety of pipe I.D.s without having to tailor the diameter of the locating member 46 for the various pipe sizes. To this end, a purging apparatus 70 is provided having a modified locating member 72, as illustrated in FIGS. 4 and 5. The locating member 72 can have a wide variety of shapes and is illustrated as being a hexagonal plate, preferably made from 0.75 inch thick aluminum. Mounted to the plate 74 are three expansible air rams 76 with each being of identical construction. The air rams 76 each include an air cylinder 78 having a piston 80 attached to a piston rod 81 mounted for sliding reciprocating movement therein. The air rams 76 can each be supplied with pressurized air from an air supply line 82 connected to a shop air source (not shown). The piston rods 81 can each include pipe engaging pads 83 at the end of the rods 81 distal from the piston 80 outside of the air cylinders 78. Thus, with the cylinders 78 pressurized, the shafts 81 will slide outwardly until their pads 83 securely engage the pipe inner wall surface 54. A split distribution box 84 may be provided to ensure that each cylinder 78 is equally pressurized with shop air so as to accurately center the locating member 72 and accordingly the gas feed line 24 within the pipe section 22. With the use of a locating member 72 having air rams 76 mounted thereon, the purging apparatus 70 can be used with a wide range of different diameter pipes. To provide for further flexibility, the air rams 76 can be slidably mounted on the locating member 72 so that they can be adjusted outwardly from the center of the locating member 72 for larger diameter pipes. After a welding operation is completed, the cylinders 78 are evacuated to cause the rods 81 to retract and allow for easy removal of the purging apparatus 10 from the welded pipes. In all other respects, the purging apparatus 70 is constructed and operates the same as the purging apparatus 10 with the gas feed line 24 attached to the elongate member 30 having counterbalance 42 and journalled for rotation in the shaft and bearing assembly 44.

While the invention has been described with respect to its preferred embodiments, which constitute the best modes known to the inventor, it should be understood that various changes and modifications may be made without departing from the scope and spirit of the invention which is intended to be set forth in the claims appended hereto.

I claim:

1. In combination, a pair of pipes having butt ends spaced from one another to define a root-gap therebetween, and having respective substantially circular cylindrical interior surfaces defining predetermined diameters thereof, and an apparatus providing inert gas to a desired location along the root-gap between the spaced butt ends of pipes which are rotated for a welding operation to weld the butt ends together, the combination comprising:

a gas feed line separate from and disposed in one of the pipes to be welded for feeding inert gas from an inert gas source into said one pipe, said gas feed line extending substantially axially and centrally through said one pipe to said spaced butt ends with said gas feed line extending a predetermined distance in and along the length of said one pipe, the predetermined distance being much greater than the predetermined pipe diameter;

a locating member for mounting the feed line to extend substantially axially, centrally and horizontally in a first direction in said one of said pipes and rotatable relative thereto with the feed line remaining fixed and not rotating with the pipes as they are rotated during welding, said locating member engaging only said interior cylindrical surface of said one of said pipes at a plurality of locations about said interior to maintain said feed line spaced from said interior surface;

a gas locator tube communicating with the gas feed line to direct inert gas from the gas feed line in a second direction different from the first direction towards the space between the pipe butt ends to be welded, the locator tube being rigidly connected to the gas feed line and capable of continually directing inert gas in the second direction as the pipe is rotated during a welding operation; and a small trailing shield which accumulates and concentrates inert gas from the feed line and locator tube in a small area defined in the shield allowing for rapid purging of oxygen in the atmospheric air therefrom and providing a substantially inert atmosphere on the underside of the root-gap between the pipe butt ends to be welded.

2. The combination of claim 1 wherein the first and second directions are substantially perpendicular to each other.

3. The combination of claim 1 wherein the first direction is in an axial direction and the second direction is in a radial direction relative to the pipe.

4. The combination of claim 1 wherein the gas locator tube is an elongate tube having spaced ends with one end including a single gas outlet port which leads directly into the small area defined in the trailing shield and the other end including an enlarged weighted counterbalance, the gas outlet port and trailing shield being adjacent the open root-gap pipe joint to be welded.

5. The combination of claim 1 including an elongate hub shaft having the gas feed line extending therethrough and being rotatable about the gas feed line and the locating member being mounted to the hub shaft and sized to snugly fit within the pipe whereby the hub shaft and locating member rotate with the pipe about the feed line as the pipe is rotated during a welding operation.

6. In combination, a pair of pipes having butt ends spaced from one another to define a root-gap therebetween, and having respective substantially circular cylindrical interior surfaces defining predetermined diameters thereof, and an apparatus for concentrating an inert gas at a localized region along the root gap between the spaced butt ends of the pipes to be welded, the combination comprising:

a gas feed line extending substantially axially and centrally through one of the pipes to be welded directing an inert gas from an inert gas source axially along the length of said one of said pipes to said spaced butt ends with said gas feed line extending a predetermined distance in and along the length of said one pipe, the predetermined distance being much greater than the predetermined pipe diameter;

a locating member including a central aperture therethrough mounted in the pipe axially spaced from the joint to be welded, said locating member engaging said interior surface of said one pipe at a plurality of locations about said interior to maintain said feed line spaced from said interior surface;

a shaft and bearing assembly extending through the locating member central aperture with the gas feed line extending through the shaft of the assembly and journalled for rotation therein by the bearings of the assembly so that the feed line remains fixed as the pipes are rotated during welding with the locating member and shaft rotating with the pipes about the feed line; and pendulum means attached to the gas feed line for directing inert gas from the feed line in a predetermined radial direction at the butt end of the pipe toward the joint to be welded as the pipe is rotated during a welding operation, wherein the pendulum means includes an elongate member having spaced ends including a hollow tube portion connected to the gas feed line extending substantially perpendicular thereto and having a single gas outlet port at one end of the elongate member and an enlarged weighted counterbalance portion at the other end of the elongate member to maintain the ends of the member substantially vertically aligned with each other with the hollow tube portion in an upright position for directing inert gas from the feed line therethrough out from the gas outlet portion thereof toward the space between the pipe butt ends as the pipe is rotated during a welding operation, and a small trailing shield at the single gas outlet port of the hollow tube portion to define the small localized region in which inert gas flowing through the gas feed line and elongate member tube portion is concentrated for providing an almost instantaneous purge of oxygen from the localized region defined by the trailing shield.

7. The combination of claim 6 wherein the locating member includes expansible air ram means for securely engaging an inner wall surface of a pipe to position the gas feed line substantially along a central axis of the pipe during a welding operation.

8. A method of supplying inert gas to a localized zone adjacent a pipe joint to be welded, the method comprising the steps of:

directing inert gas through an inert gas feed tube having a delivery end along the length of a pipe to the butt end thereof toward a joint to be welded;

causing the inert gas to accumulate in a localized region at the joint to be welded to purge the region of other gases before a welding operation begins; and maintaining the delivery end at a predetermined substantially fixed location which remains adjacent the top of the pipe interior after the welding operation begins and as the pipe is rotated during the welding operation.

9. The method of claim 8 further including the step of redirecting the inert gas after it has reached the pipe butt end radially toward the joint to be welded.

10. The method of claim 9 wherein the redirecting step includes the step of providing an elongate member having a hollow tube portion and the inert gas is caused to accumulate in the joint region by extending the hollow tube portion towards the joint region.

11. The method of claim 10 wherein the maintaining step further includes the step of counterbalancing the elongate member to maintain the hollow tube portion in an upright position extending towards the joint region as the pipe is rotated during a welding operation.

12. A method of supplying inert gas to a localized zone adjacent a pipe joint to be welded, the method comprising the steps of:

providing two pipe sections to be welded with their open butt ends in adjacent spaced relation to each other to form an unsealed root gap between the butt ends to be connected;

directing inert gas through an inert gas feed tube having a delivery end along the length of one of the pipes to the open butt end thereof aligned with the root gap formed between the adjacent butt ends to be connected by welding;

causing the inert gas to rapidly accumulate in a localized region at the joint to be welded to rapidly purge the region of other gases before a welding operation begins;

welding the pipe butt ends together by rotating the pipes without having to remove sealing tape from between the unsealed pipe butt ends over the root-gap formed therebetween; and maintaining the delivery end at a predetermined substantially fixed location which remains adjacent the top of the pipe interior after the welding operation begins and as the pipe is rotated during the welding operation.

* * * * *